US011285955B2

(12) United States Patent
Tsuji et al.

(10) Patent No.: US 11,285,955 B2
(45) Date of Patent: Mar. 29, 2022

(54) VEHICLE CONTROL APPARATUS AND VEHICLE WITH LANE CHANGE REGULATION

(71) Applicant: HONDA MOTOR CO., LTD., Tokyo (JP)

(72) Inventors: Kanta Tsuji, Wako (JP); Tadahiko Kanoh, Wako (JP); Daichi Kato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 148 days.

(21) Appl. No.: 16/784,572

(22) Filed: Feb. 7, 2020

(65) Prior Publication Data

US 2020/0269840 A1 Aug. 27, 2020

(30) Foreign Application Priority Data

Feb. 21, 2019 (JP) .............................. JP2019-029547

(51) Int. Cl.
*B60W 30/18* (2012.01)
*B60W 50/08* (2020.01)
*B60W 30/09* (2012.01)

(52) U.S. Cl.
CPC .... *B60W 30/18163* (2013.01); *B60W 50/087* (2013.01); *B60W 30/09* (2013.01)

(58) Field of Classification Search
CPC ......... B60W 30/18163; B60W 50/087; B60W 30/09; B60W 2554/804; B60W 2554/802; B60W 60/0011; B60W 30/12
See application file for complete search history.

(56) References Cited

U.S. PATENT DOCUMENTS

| 8,634,980 | B1* | 1/2014 | Urmson | G05D 1/0055 |
| | | | | 701/23 |
| 9,096,267 | B2* | 8/2015 | Mudalige | B62D 15/0255 |
| 10,676,093 | B2* | 6/2020 | Nishiguchi | B60W 30/18163 |
| 2015/0149017 | A1* | 5/2015 | Attard | B60W 30/18163 |
| | | | | 701/23 |
| 2015/0154458 | A1* | 6/2015 | Lee | G06K 9/00798 |
| | | | | 348/118 |
| 2017/0080952 | A1* | 3/2017 | Gupta | B60W 50/14 |
| 2017/0082452 | A1* | 3/2017 | Sumizawa | G08G 1/0141 |
| 2018/0178713 | A1 | 6/2018 | Fujii | |
| 2018/0178801 | A1* | 6/2018 | Hashimoto | G05D 1/0088 |
| 2019/0098471 | A1* | 3/2019 | Rech | H04W 4/02 |
| 2019/0155283 | A1* | 5/2019 | Herbach | G06Q 10/02 |
| 2019/0310100 | A1* | 10/2019 | Yang | G08G 1/0137 |
| 2020/0070834 | A1* | 3/2020 | Mizoguchi | B60W 30/18163 |

(Continued)

FOREIGN PATENT DOCUMENTS

JP 2018-103768 A 7/2018

*Primary Examiner* — Donald J Wallace
*Assistant Examiner* — Daniel M. Robert
(74) *Attorney, Agent, or Firm* — Thomas | Horstemeyer, LLP

(57) ABSTRACT

A vehicle control apparatus for controlling a vehicle, includes a traveling control unit configured to control traveling of the vehicle including a course change, and a regulation unit configured to regulate a plurality of course changes of the vehicle within a predetermined period by the traveling control unit. Regulation by the regulation unit is changed based on a situation of the vehicle at the time of traveling.

3 Claims, 11 Drawing Sheets

(56) References Cited

U.S. PATENT DOCUMENTS

| | | | |
|---|---|---|---|
| 2020/0217685 A1* | 7/2020 | Koh | G06K 9/00798 |
| 2021/0122374 A1* | 4/2021 | Da Silva | G01C 21/3658 |
| 2021/0163011 A1* | 6/2021 | Maru | G01C 21/3407 |

* cited by examiner

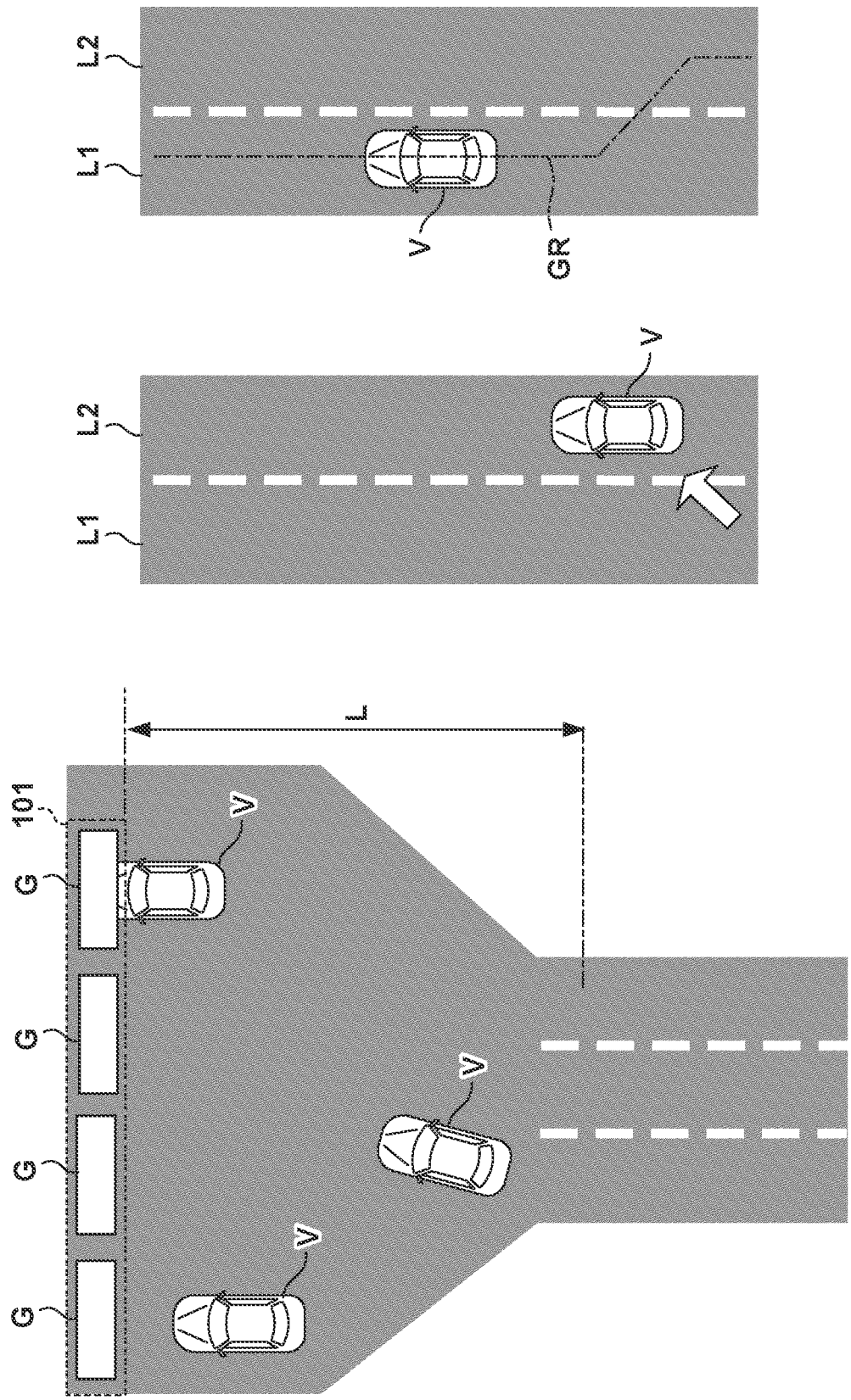

VEHICLE CONTROL APPARATUS AND VEHICLE WITH LANE CHANGE REGULATION

CROSS-REFERENCE TO RELATED APPLICATION(S)

This application claims priority to and the benefit of Japanese Patent Application No. 2019-029547 filed on Feb. 21, 2019, the entire disclosure of which is incorporated herein by reference.

BACKGROUND OF THE INVENTION

Field of the Invention

The present invention relates to a vehicle control apparatus and a vehicle.

Description of the Related Art

As a driving support technique for a vehicle, there has been proposed a technique of performing a course change of a vehicle represented by a lane change by automatic control (for example, Japanese Patent Laid-Open No. 2018-103768). Such driving support reduces a burden on an occupant and improves the convenience of a vehicle.

A continuous course change of a vehicle lacks attention to peripheral vehicles and also lacks conformity to the transportation society. Hence, a continuous course change of a vehicle should be regulated. However, if the continuous course change is uniformly regulated, the convenience of the vehicle may be reduced by, for example, detouring without passing through a route preferable to arrive at the destination.

SUMMARY OF THE INVENTION

It is an object of the present invention to regulate a continuous course change of a vehicle without greatly lowering the convenience of the vehicle.

According to an aspect of the present invention, there is provided, a vehicle control apparatus for controlling a vehicle, comprising: a traveling control unit configured to control traveling of the vehicle including a course change; and a regulation unit configured to regulate a plurality of course changes of the vehicle within a predetermined period by the traveling control unit, wherein regulation by the regulation unit is changed based on a situation of the vehicle at the time of traveling.

Further features of the present invention will become apparent from the following description of exemplary embodiments (with reference to the attached drawings).

BRIEF DESCRIPTION OF THE DRAWINGS

FIGS. 9A to 9C are explanatory views showing still another example of regulation;

DESCRIPTION OF THE EMBODIMENTS

Figure 1:
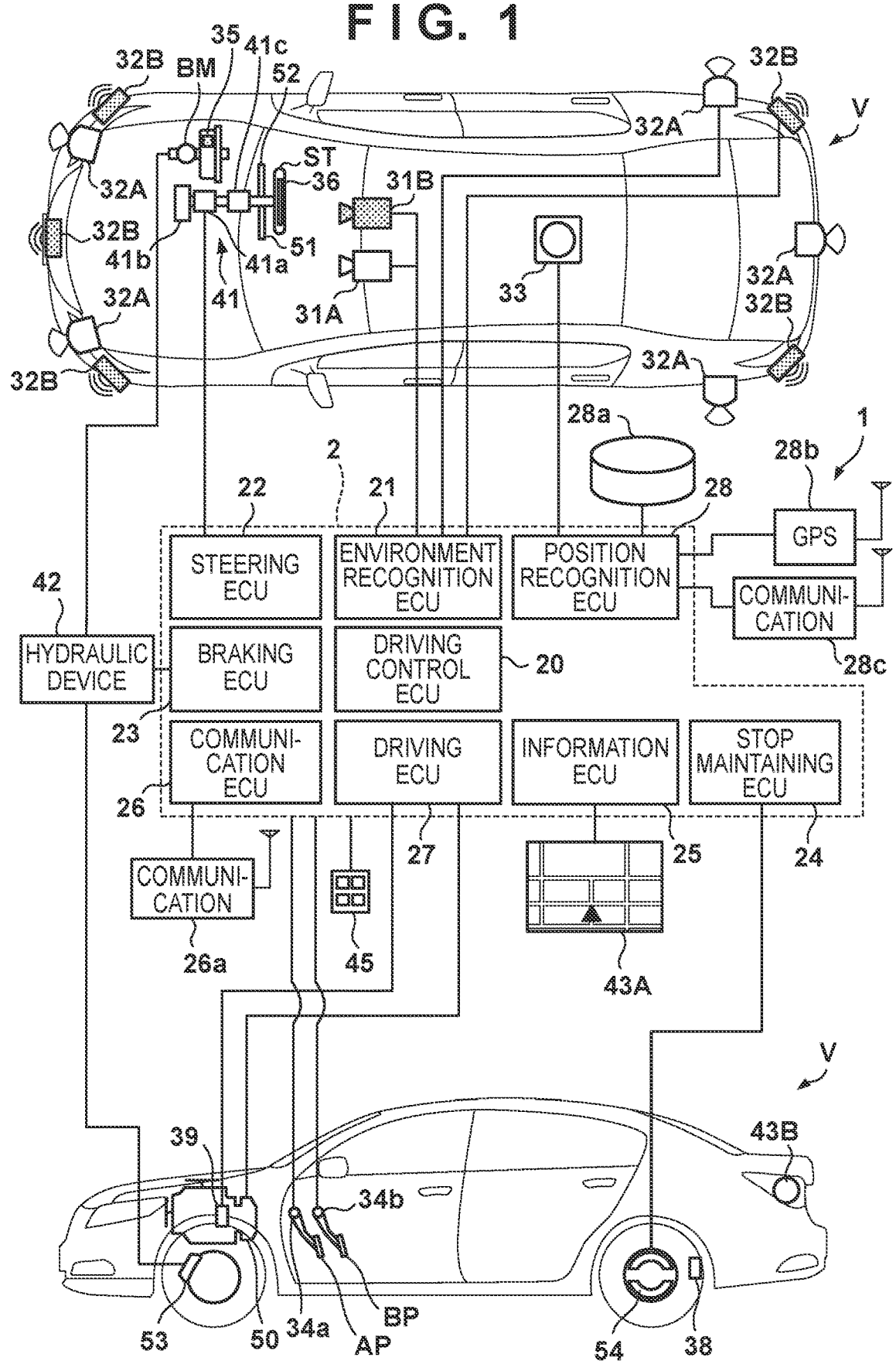
FIG. 1 is a block diagram of a vehicle and a control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle V and a control apparatus 1 thereof according to an embodiment of the present invention. FIG. 1 shows the schematic arrangement of the vehicle V in a plan view and a side view. As an example, the vehicle V is a sedan-type four-wheeled passenger car.

The vehicle V according to this embodiment is, for example, a parallel-type hybrid vehicle. In this case, a power plant 50 that is a traveling driving unit configured to output a driving force to rotate the driving wheels of the vehicle V can include an internal combustion engine, a motor, and an automatic transmission. The motor can be used as a driving source configured to accelerate the vehicle V and can also be used as a power generator at the time of deceleration or the like (regenerative braking).

<Control Apparatus>

The arrangement of a control apparatus 1 that is an in-vehicle apparatus of the vehicle V will be described with reference to FIG. 1. The control apparatus 1 includes an ECU group (control unit group) 2. The ECU group 2 includes a plurality of ECUs 20 to 28 configured to be communicable with each other. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIG. 1, the names of the representative functions of the ECUs 20 to 28 are given. For example, the ECU 20 is denoted by "driving control ECU".

The ECU 20 executes control concerning driving support including automated driving of the vehicle V. In the automated driving, driving (acceleration of the vehicle V by the power plant 50, or the like), steering, and braking of the vehicle V are automatically performed without needing an operation of the driver. Additionally, in manual driving, the ECU 20 can execute, for example, traveling support control such as collision mitigation braking and lane departure suppression. In the collision mitigation braking, if the possibility of collision against an obstacle on the front side is high, a brake device 53 is instructed to operate, thereby supporting collision avoidance. In the lane departure suppression, if the possibility of lane departure of the vehicle V is high, an electric power steering device 41 is instructed to operate, thereby supporting lane departure avoidance. In addition, in both automated driving and manual driving, the ECU 20 can execute automatic vehicle following control that makes the vehicle V automatically follow up the preceding vehicle. In the automated driving, all of acceleration, deceleration, and steering of the vehicle V may automatically be performed. In the manual driving, acceleration and deceleration of the vehicle V may automatically be performed.

The ECU 21 is an environment recognition unit configured to recognize the traveling environment of the vehicle V based on the detection results of detection units 31A, 31B, 32A, and 32B that detect the peripheral situation of the vehicle V. In this embodiment, the detection units 31A and 31B are cameras (to be sometimes referred to as the camera 31A and the camera 31B hereinafter) configured to capture the front side of the vehicle V, and are attached to the windshield inside the vehicle cabin at the roof front of the vehicle V. When images captured by the camera 31A are analyzed, the contour of a target or a division line (a white line or the like) of a lane on a road can be extracted.

In this embodiment, the detection unit 32A is a LiDAR (Light Detection and Ranging) (to be sometimes referred to as the LiDAR 32A hereinafter), and detects a target around the vehicle V or measures the distance to a target. In this embodiment, five LiDARs 32A are provided; one at each corner of the front portion of the vehicle V, one at the center of the rear portion, and one on each side of the rear portion. The detection unit 32B is a millimeter wave radar (to be sometimes referred to as the radar 32B hereinafter), and detects a target around the vehicle V or measures the distance to a target. In this embodiment, five radars 32B are provided; one at the center of the front portion of the vehicle V, one at each corner of the front portion, and one at each corner of the rear portion.

The ECU 22 is a steering control unit configured to control the electric power steering device 41. The electric power steering device 41 includes a mechanism that steers the front wheels in accordance with the driving operation (steering operation) of the driver on a steering wheel ST. The electric power steering device 41 includes a driving unit 41a including a motor that generates a driving force (to be sometimes referred to as a steering assist torque) to assist the steering operation or automatically steer the front wheels, a steering angle sensor 41b, a torque sensor 41c that detects the steering torque (called a steering burden torque discriminated from the steering assist torque) on the driver, and the like. In addition, the ECU 22 can acquire the detection result of a sensor 36 that detects whether the driver is gripping the steering wheel ST, and can monitor the gripping state of the driver.

Turn signal levers 51 and 52 are provided near the steering wheel ST. By an operation of an occupant on the turn signal levers 51 and 52, corresponding left and right direction indicators (not shown) can be operated. Additionally, in this embodiment, the occupant can instruct the automatic course change of the vehicle V by an operation on the turn signal levers 51 and 52. As the instruction of the automatic course change, for example, the occupant can instruct a lane change to the left lane by an operation on the turn signal lever 51, and can also instruct a lane change to the right lane by an operation on the turn signal lever 52. The instruction of the course change by the occupant may be accepted during automated driving or during automatic vehicle following control.

The ECU 23 is a braking control unit configured to control a hydraulic device 42. A braking operation of the driver on a brake pedal BP is converted into a fluid pressure by a brake master cylinder BM and transmitted to the hydraulic device 42. The hydraulic device 42 is an actuator capable of controlling, based on the fluid pressure transmitted from the brake master cylinder BM, the fluid pressure of hydraulic oil to be supplied to the brake device (for example, a disc brake device) 53 provided in each of the four wheels. The ECU 23 performs driving control of a solenoid valve and the like provided in the hydraulic device 42. The ECU 23 can light a brake lamp 43B at the time of braking. This can increase the attention of a following vehicle to the vehicle V.

The ECU 23 and the hydraulic device 42 can form an electric servo brake. The ECU 23 controls, for example, the distribution of a braking force by the four brake devices 53 and a braking force by regenerative braking of the motor provided in the power plant 50. The ECU 23 can also implement an ABS function, traction control, and the posture control function for the vehicle V based on the detection results of a wheel speed sensor 38 provided in each of the four wheels, a yaw rate sensor (not shown), and a pressure sensor 35 configured to detect the pressure in the brake master cylinder BM.

The ECU 24 is a stop maintaining control unit configured to control an electric parking brake device (for example, a drum brake) 54 provided in each rear wheel. The electric parking brake device 54 includes a mechanism that locks the rear wheel. The ECU 24 can control lock and unlock of the rear wheels by the electric parking brake devices 54.

The ECU 25 is an in-vehicle notification control unit configured to control an information output device 43A that notifies information in the vehicle. The information output device 43A includes, for example, a head-up display or a display device provided on an instrument panel, or a voice output device. The information output device 43A may further include a vibration device. The ECU 25 causes the information output device 43A to output, for example, various kinds of information such as a vehicle speed and an atmospheric temperature, information such as a route guidance, and information concerning the state of the vehicle V.

The ECU 26 includes a communication device 26a for inter-vehicle communication. The communication device 26a performs wireless communication with another vehicle on the periphery and performs information exchange between the vehicles.

The ECU 27 is a driving control unit configured to control the power plant 50. In this embodiment, one ECU 27 is assigned to the power plant 50. However, one ECU may be assigned to each of the internal combustion engine, the motor, and the automatic transmission. The ECU 27 controls the output of the internal combustion engine or the motor or switches the gear range of the automatic transmission in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission is provided in the automatic transmission. The vehicle speed of the vehicle V can be calculated from the detection result of the rotation speed sensor 39.

The ECU 28 is a position recognition unit configured to recognize the current position or the course of the vehicle V. The ECU 28 performs control of a gyro sensor 33, a GPS sensor 28b, and a communication device 28c and information processing of a detection result or a communication result. The gyro sensor 33 detects the rotary motion of the vehicle V. The course of the vehicle V can be determined based on the detection result of the gyro sensor 33, and the like. The GPS sensor 28b detects the current position of the vehicle V. The communication device 28c performs wireless communication with a server configured to provide map information and traffic information, and acquires these pieces of information. A database 28a can store accurate map information. The ECU 28 can more accurately specify the position of the vehicle V on a lane based on the map information and the like.

An input device 45 is arranged in the vehicle such that the driver can operate it, and accepts input of an instruction or information from the driver.

<Control Example>

The control apparatus 1 can switch the driving control mode of the vehicle V between an automated driving mode and a manual driving mode in accordance with, for example, an instruction of the occupant. In the automated driving mode, automated driving control of the vehicle V is executed. In the automated driving control, the ECU 20 sets the action plan of the vehicle V, outputs a control instruction to each of the ECU 22, the ECU 23, and the ECU 27 in accordance with the set action plan to control steering, braking, and driving of the vehicle V, and automatically makes the vehicle V travel without depending on the driving operation of the driver. The ECU 20 sets the traveling route of the vehicle V, and makes the vehicle V travel along the set traveling route by referring to the position recognition result of the ECU 28 and the recognition result of a target.

If the occupant instructs a destination, route guidance to guide the vehicle V to the destination is performed. A target is recognized based on the detection results of the detection units 31A, 31B, 32A, and 32B. If the vehicle V can follow the preceding vehicle during traveling on an expressway, automatic vehicle following control can be executed. In the automatic vehicle following control, the vehicle automatically follows the preceding vehicle. Even during manual driving control, automatic vehicle following control can be executed as one type of driving support control operation.

Figure 2A:
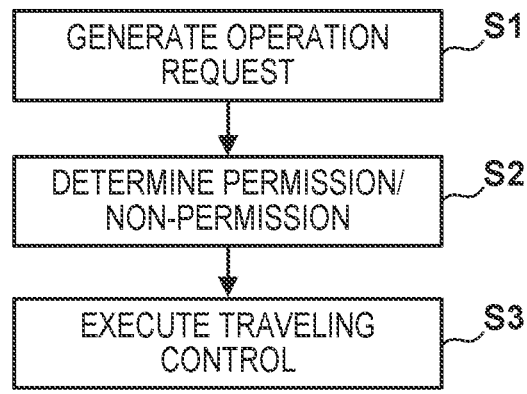
FIGS. 2A and 2B are flowcharts showing an example of processing executed by the vehicle control apparatus shown in FIG. 1.

FIG. 2A shows the procedure of control of the ECU 20, which is repetitively executed concerning automation of traveling of the vehicle V. In step S1, an operation request is generated. The operation request includes an operation request generated on the system side and an operation request generated by an instruction of the occupant. The operation request generated on the system side includes, for example, acceleration, deceleration, right/left turn, passing the preceding vehicle, a lane change, and the like to be used by the ECU 20 to execute an action plan. The operation request by an instruction of the driver includes for example, an instruction by operation input of the occupant.

In step S2, it is determined whether to permit the operation request generated in step S1 or not. In the permission/non-permission determination, for example, it is determined, by referring to the vehicle position recognition result the recognition results of the traveling road and targets, whether the operation request generated in step S1 can be executed. If it is determined that the operation request can be executed, in step S3, traveling control corresponding to the operation request in step S1 is executed. Here, control instructions are output to the ECU 22, the ECU 23, and the ECU 27 to control steering, braking, and driving of the vehicle V.

<Course Change>

Figure 3:
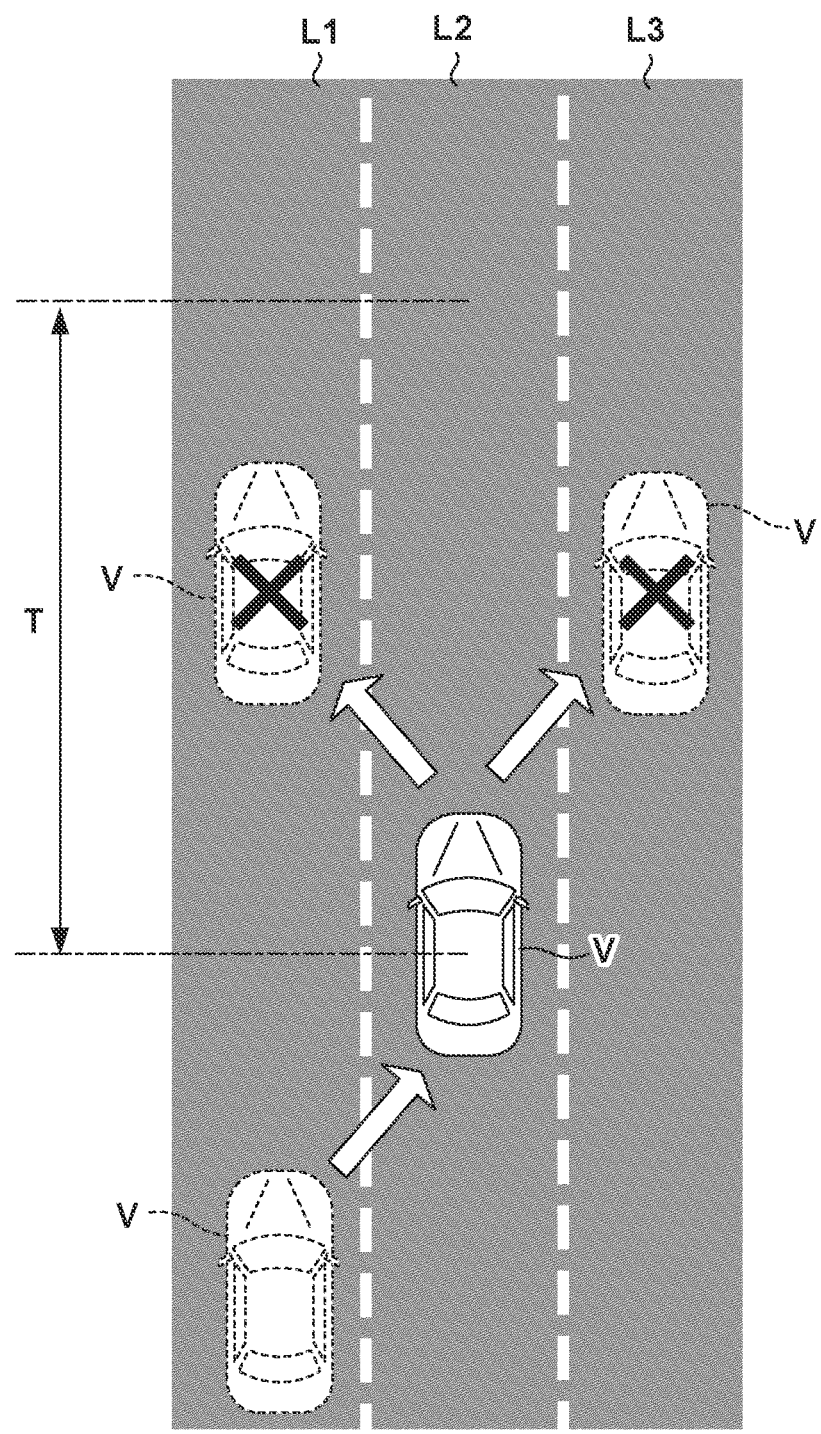
FIG. 3 is an explanatory view showing an example of regulating a continuous lane change of a vehicle.

The automatic course change of the vehicle V under the control of the control apparatus 1 will be described. In this embodiment, as an example of the course change, a lane change will mainly be described. A continuous lane change of a vehicle lacks attention to peripheral vehicles and also lacks conformity to the transportation society. In this embodiment, the continuous lane change of the vehicle V is regulated. FIG. 3 is an explanatory view of that. When the vehicle V traveling on a lane L1 completes a lane change to a lane L2, the next lane change is regulated for a regulation time T. That is, a plurality of lane changes are regulated during the regulation time T. FIG. 3 shows an example in which the lane change to the lane L1 or a lane L3 is not permitted. Note that in this embodiment, the regulation period is set to the time T. Instead, a traveling distance may be used. In addition, the starting point of the regulation period is defined as the time of completion of the lane change. Another starting point such as the start of the lane change can also be employed, and substantially regulating a continuous lane change suffices.

On the other hand, if the continuous lane change of the vehicle V is uniformly regulated, the convenience of the vehicle may be reduced by, for example, detouring without passing through a route preferable to arrive at the destination. In this embodiment, the regulation is changed based on the situation in traveling, and the regulation of the continuous lane change is relaxed under a predetermined condition. FIGS. 4A and 4B shows an example of it.

FIG. 4A shows an example in which the vehicle V changes the lane from the lane L1 to the lane L2 by route guidance, and when further continuously changing the lane from the lane L2 to the lane L3 (branch path), the lane change is permitted by relaxing the regulation. If the route guidance is the request cause of the lane change, priority is given to arrival at the destination, and the lane change is permitted.

FIG. 4B shows a case of automatic passing. FIG. 4B shows an example in which to automatically pass a vehicle V that is the preceding vehicle, the vehicle V changes the lane from the lane L1 to the lane L2, and when further continuously changing the lane from the lane L2 to the lane L1, the lane change is permitted by relaxing the regulation. In the case of automatic passing, the continuous lane change is permitted to avoid long-time traveling on the passing lane.

Figure 4C:
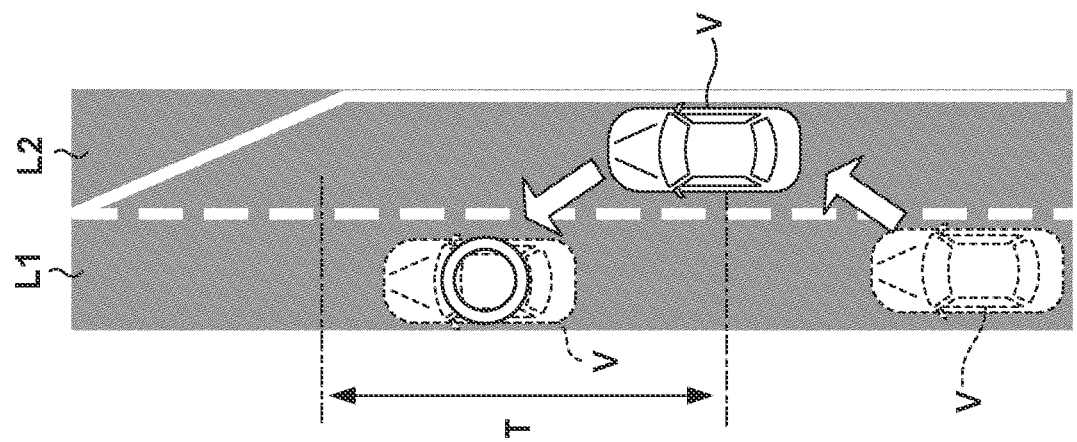
FIGS. 4A to 4C are views showing an example in which the continuous lane change of the vehicle is permitted.
Figure 4B:
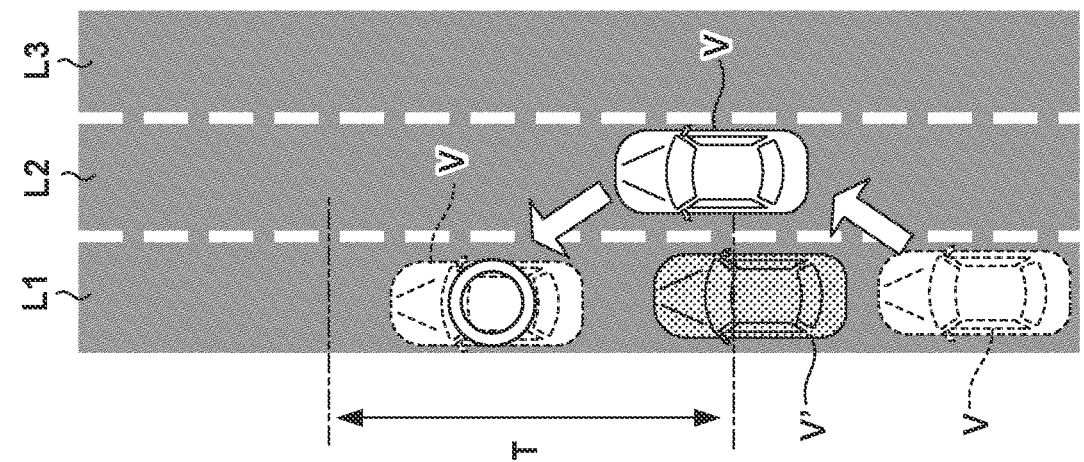
Figure 4A:
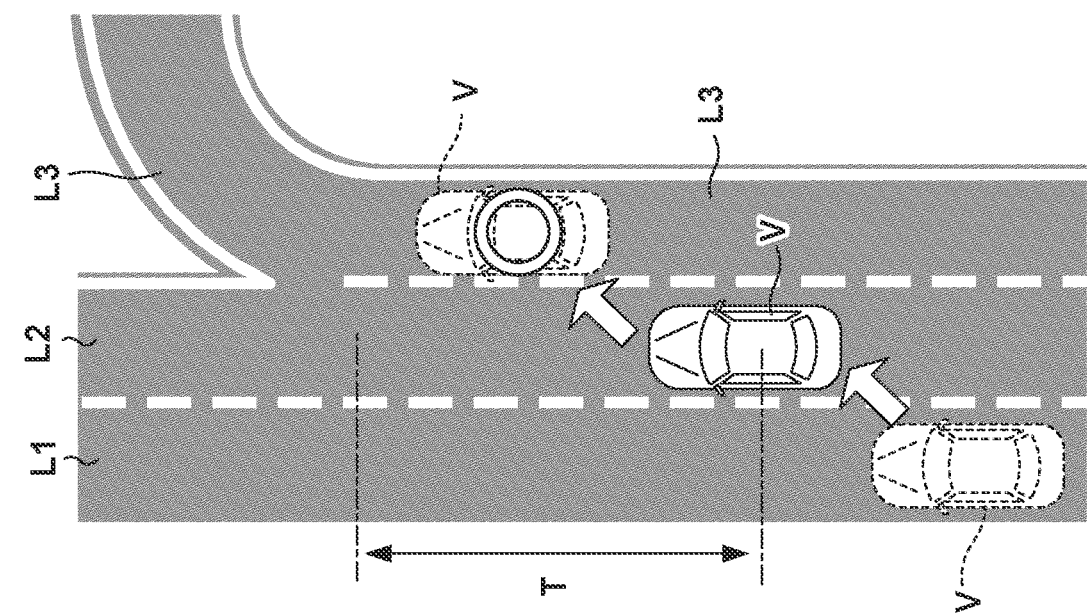

FIG. 4C shows a case of lane reduction of a traveling road. FIG. 4C shows an example in which the vehicle V changes the lane from the lane L1 to the lane L2, and when continuously changing the lane to the lane L1 after that, the lane change is permitted by relaxing the regulation. Since the lane L2 is a road that merges with the lane L1 and disappears due to lane reduction, the continuous lane change is exceptionally permitted.

Figure 2B:
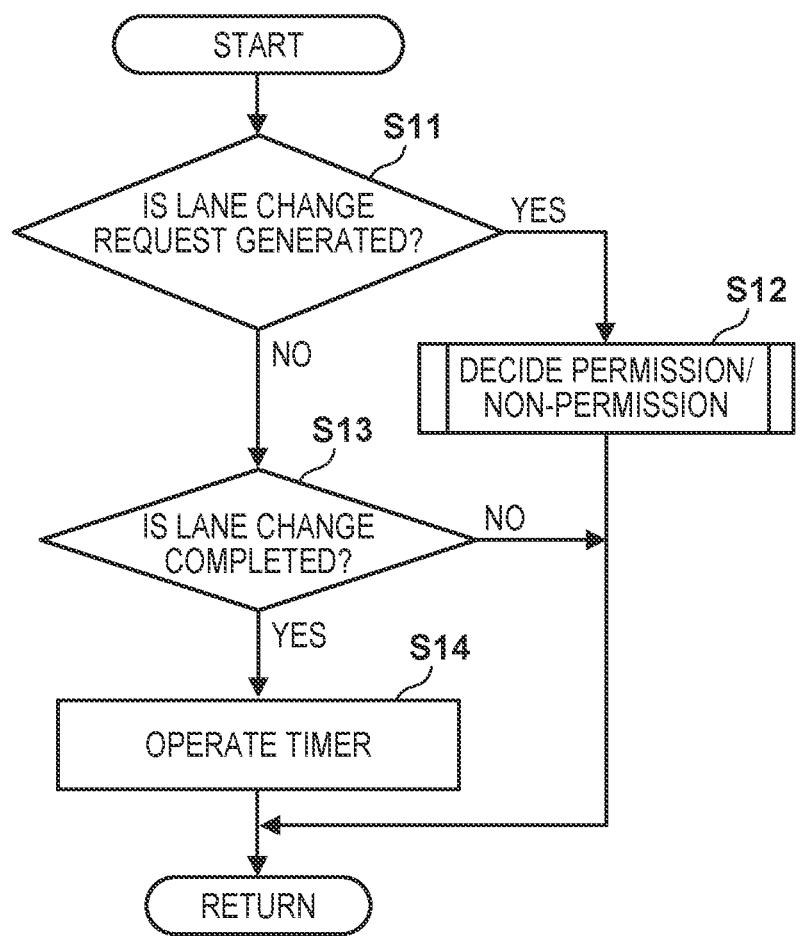

FIG. 2B shows an example of processing of the ECU 20 concerning the regulation of the continuous lane change. This is an example of processing that constitutes part of the permission/non-permission determination in step S2 of FIG. 2A.

In step S11, the ECU 20 determines whether a lane change request is generated. The lane change request includes a request generated on the system side and a request generated by an instruction of the occupant. The former is a request that the ECU 20 or the like generates based on the result of another process, including, for example, a case in which the necessity of a lane change is generated before a branch path during route guidance, a case in which automatic passing is to be performed when the preceding vehicle travels slowly, and a case in which the lane to travel will disappear due to lane reduction. The latter corresponds to, for example, a case in which a lane change instruction is input on the turn signal lever 51 or 52. If a lane change request is generated, the process advances to step S12. If a lane change request is not generated, the process advances to step S13.

In step S12, the ECU 20 performs permission/non-permission decision for the lane change request, and ends the processing. Details will be described later. In steps S13 and S14, the ECU 20 performs processing concerning the regulation time T. In step S13, if there is a lane change under execution, the ECU 20 determines whether it is completed. If the lane change is completed, the process advances to step S14. Otherwise, or if a lane change is not being executed, the processing is ended. In step S14, the ECU 20 operates a timer to start measuring the regulation time T. For example, the regulation time T (for example, a time of 5 to 10 sec) is set as an initial value, and the time is measured until the remaining time becomes 0.

Note that in the regulation time T, the generation of the lane change request on the system side may be suppressed. In the suppression, the generation of the lane change request on the system side is inhibited in principle. Exceptionally, if a lane change needs to be performed for the purpose of route guidance to the destination, or if the necessity of regulation of a lane change is eliminated by the arrival at a road having no separated lanes, the generation of the lane change request may be permitted.

<Permission/Non-Permission Decision Processing>

Figure 5:
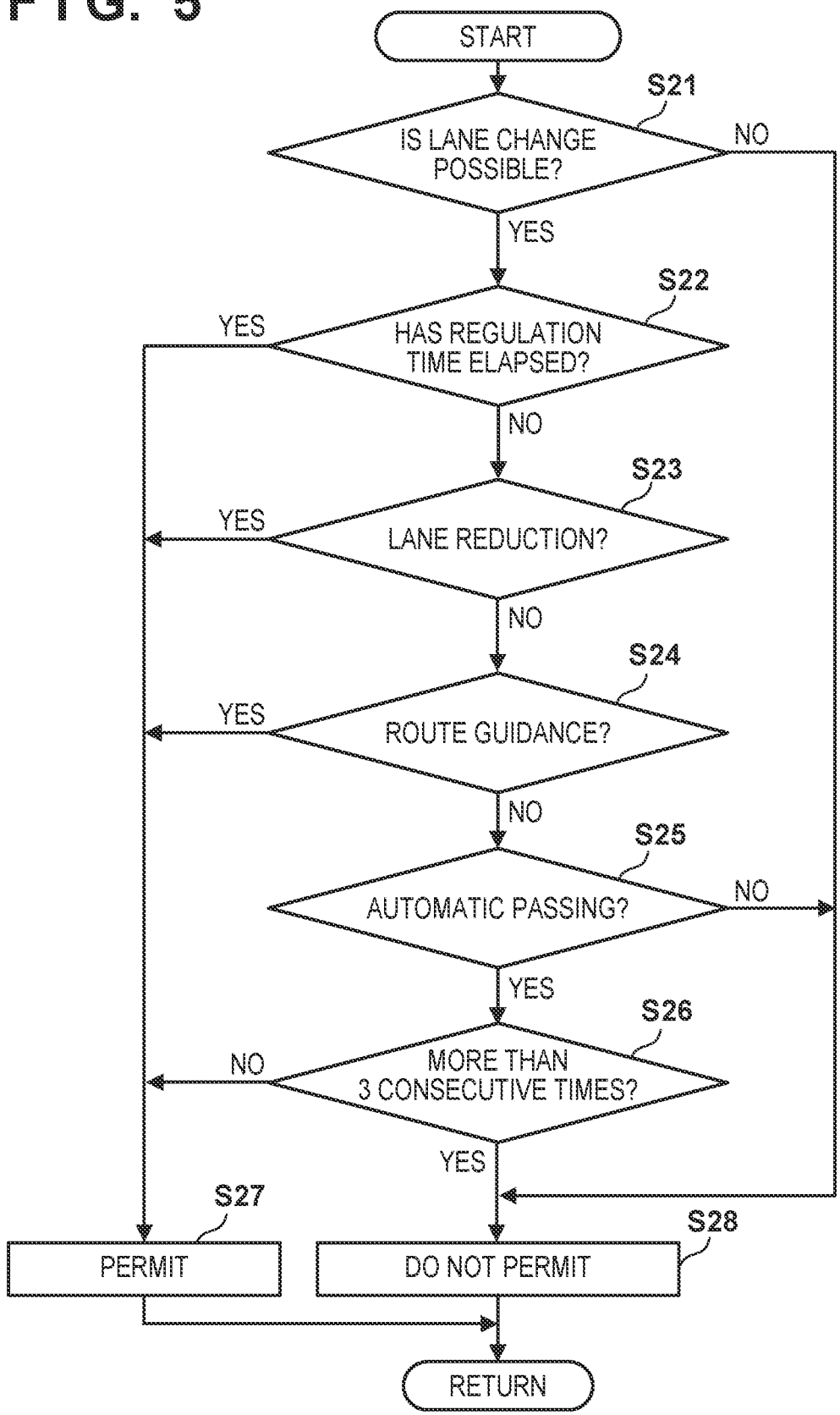
FIG. 5 is a flowchart showing an example of processing executed by the vehicle control apparatus shown in FIG. 1.

FIG. 5 is a flowchart showing an example of permission/non-permission decision processing in FIG. 2B. In this example, the regulation of the continuous lane change is changed based on the request cause of the lane change. In step S21, regardless of whether it is a continuous lane change, the ECU 20 determines, by referring to a target recognition result and the like, whether the situation allows the vehicle V to safely change the lane. If the situation allows the vehicle to change the lane, the process advances to step S22. If the situation does not allow the vehicle to change the lane, the process advances to step S28. In step S28, non-permission of the lane change is set, and the processing is ended. Hence, the lane change requested in step S11 of FIG. 2B is not executed.

In step S22, the ECU 20 determines whether the regulation time T has elapsed from the previous lane change. That is, the ECU 20 determines whether it is a continuous lane change. Whether the regulation time T has elapsed is determined by referring to the timer whose operation has been started in step S14 of FIG. 2B. If the remaining time of the timer is 0, the process advances to step S27. If the remaining time is longer than 0, the process advances to step S23. In step S27, permission of the lane change is set, and the processing is ended. Hence, the lane change requested in step S11 of FIG. 2B is executed.

In steps S23 to S25, the type of the request cause of the lane change request for which the regulation should be relaxed is determined. In step S23, the ECU 20 determines whether the lane change request in step S11 of FIG. 2B is generated on the system side because the lane to travel will disappear due to lane reduction. If the lane change request is generated due to lane reduction, the process advances to step S27. Hence, the continuous lane change is permitted under a situation as shown in FIG. 4C. If it is not a lane change request generated due to lane reduction, the process advances to step S24.

In step S24, the ECU 20 determines whether the lane change request in step S11 of FIG. 2B is generated by route guidance for guiding the vehicle V to the destination. If the lane change request is generated by route guidance, the process advances to step S27. That is, if the lane change request is generated by route guidance, the regulation of the continuous lane change is changed, and the continuous lane change is permitted. Hence, the continuous lane change is permitted under a situation as shown in FIG. 4A. If it is not a lane change request generated by route guidance, the process advances to step S25.

In step S25, the ECU 20 determines whether the lane change request in step S11 of FIG. 2B is generated by automatic passing in which the vehicle V passes the preceding vehicle. The lane change request by automatic passing includes both a lane change request to a passing lane and a lane change request to return from a passing lane to the original lane. If it is not a lane change request generated by automatic passing, the process advances to step S28 to set non-permission of the lane change. That is, if the lane change request is generated by an instruction from the occupant or the like, the continuous lane change is not permitted. If it is a lane change request generated by automatic passing, the process advances to step S26.

In step S26, the ECU 20 determines whether the series of continuous lane changes by automatic passing will be performed three times or more if the lane change request of this time is executed. If the continuous lane change will be performed three times or more, the process advances to step S28 to set non-permission of the lane change. If the continuous lane change will be performed for the second time, the process advances to step S27 to set permission of the lane change. The number of lane changes needed to pass the preceding vehicle is two. For this reason, if it is a lane change request generated by automatic passing, the continuous lane change after the first lane change is permitted only once. Hence, the continuous lane change is permitted under a situation as shown in FIG. 4B. When the lane change request caused by route guidance and the lane change request caused by automatic passing are compared, it can be said that the regulation of the continuous lane change is lighter in route guidance. Note that as for the management of the number of lane changes caused by automatic passing in the illustrated example, the number is incremented if the lane change is performed during the regulation time T. If a lane change is performed outside the regulation time T, it is regarded as the first lane change.

As described above, according to this embodiment, a continuous course change (in particular, a lane change) of the vehicle V is regulated, and on the other hand, the regulation is changed based on the situation at the time of traveling. It is therefore possible to avoid great lowering of the convenience of the vehicle V. The situation at the time of traveling is discriminated based on the request cause, thereby performing regulation and relaxation of the regulation according to the request cause.

Especially, in this embodiment, regulation is performed when the request cause of a course change request is an instruction of the occupant. Hence, if the occupant unnecessarily instructs a continuous course change, execution thereof can be regulated. In addition, for a continuous course change caused by a request on the system side, the regulation is relaxed, thereby executing the course change necessary from the viewpoint of traveling control. As for a lane change request on the system side, the regulation may be relaxed for all requests. In this embodiment, the regulation is relaxed only for a lane change request generated due to lane reduction, a lane change request generated by route guidance, and a lane change request (with a limitation on the number of times) generated by automatic passing. It is therefore possible to relax the regulation within the range needed to maintain the convenience of the vehicle V.

Note that in this embodiment, as a lane change request on the system side for which the regulation is relaxed, a case of lane reduction, a case of route guidance, and a case of automatic passing have been described as examples. The regulation may be relaxed for another lane change request on the system side. Conversely, the regulation may be relaxed for one or two of the cases of lane reduction, route guidance, and automatic passing.

Second Embodiment

Figure 6:
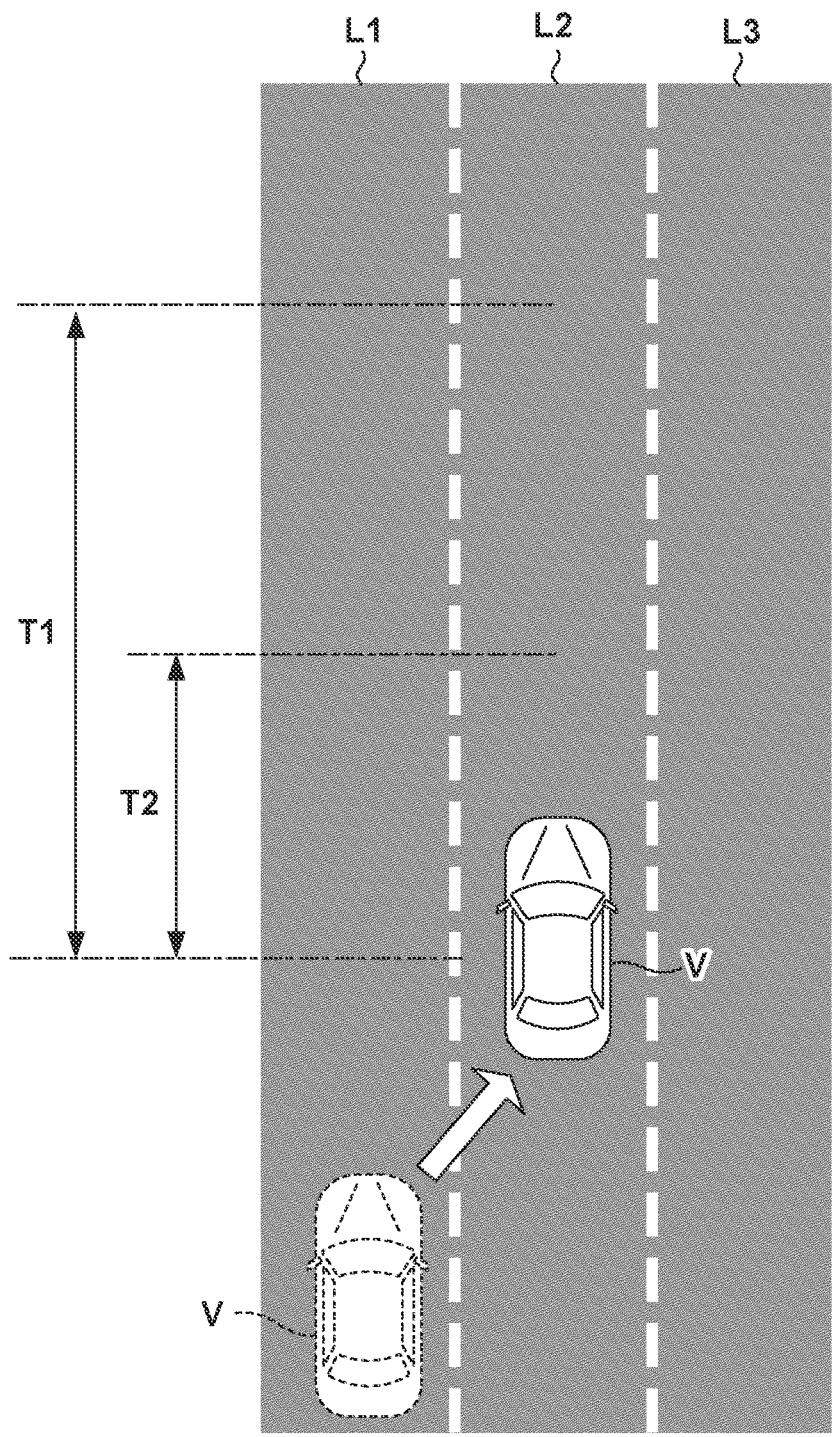
FIG. 6 is an explanatory view showing an example of different regulation periods.

In the first embodiment, as the contents of the change of the regulation for a continuous lane change, the presence/absence of regulation has been described. However, the regulation period may be changed. FIG. 6 is an explanatory view of that. In an example shown in FIG. 6, a regulation time T1 and a regulation time T2 shorter than the regulation time T1 are shown. As the principle, a lane change is not permitted during the regulation time T1. Exceptionally, during the regulation time T2, a lane change is not permitted, and the regulation is relaxed.

Figure 7:
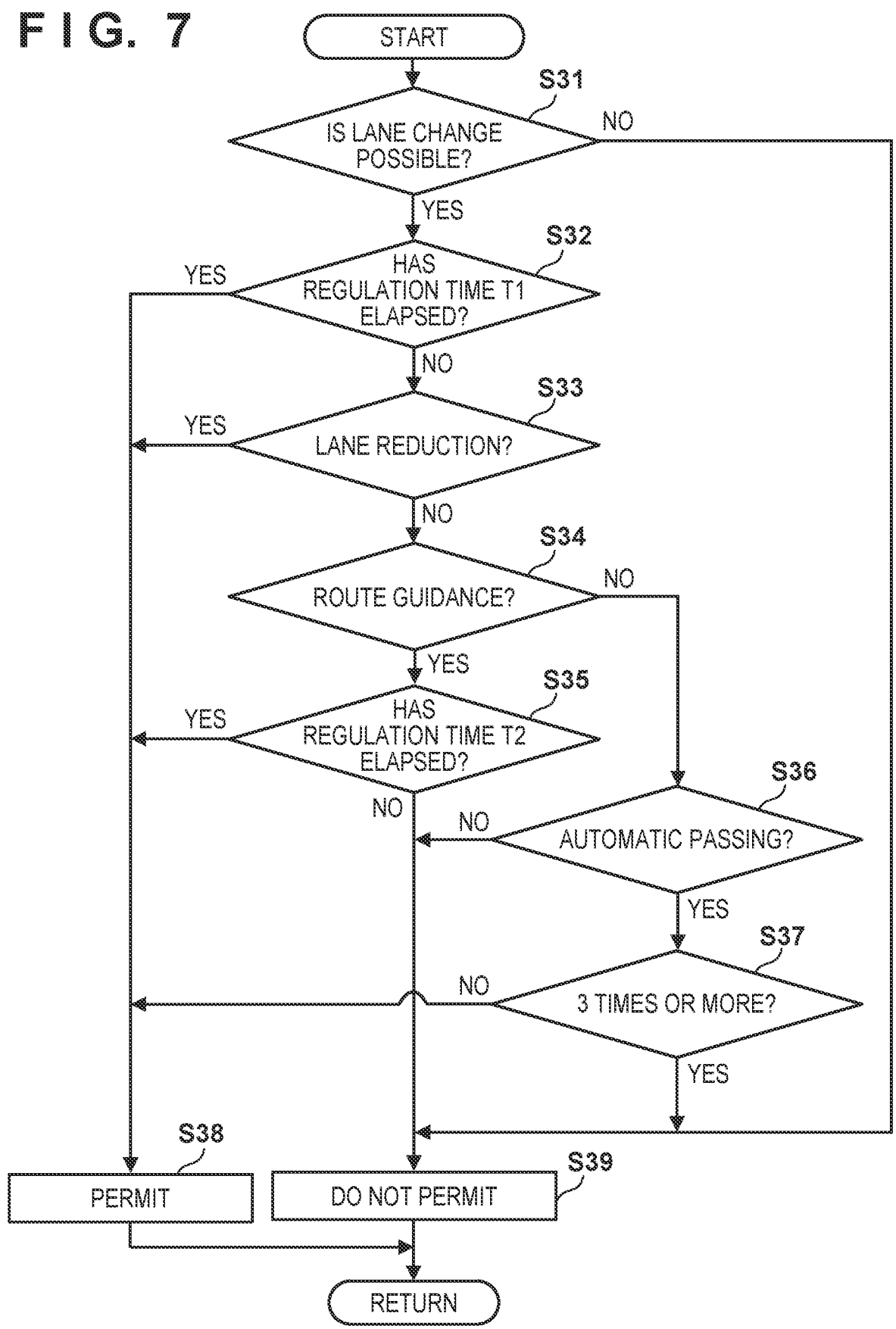
FIG. 7 is a flowchart showing another example of processing executed by the vehicle control apparatus shown in FIG. 1.

FIG. 7 is a flowchart showing an example of permission/non-permission decision processing in FIG. 2B according to this embodiment. In this example as well, as in the first embodiment, the regulation of a continuous lane change is changed based on the request cause of the lane change. Unlike the first embodiment, in a case of route guidance, a lane change request is not always permitted, and is permitted when the regulation time T2 has elapsed.

In step S31, an ECU 20 determines, by referring to a target recognition result and the like, whether the situation allows a vehicle V to safely change the lane. This is the same processing as that in step S21 of the example shown in FIG. 5. If the situation allows the vehicle to change the lane, the process advances to step S32. If the situation does not allow the vehicle to change the lane, the process advances to step S39. In step S39, non-permission of the lane change is set, and the processing is ended.

In step S32, the ECU 20 determines whether the regulation time T1 has elapsed from the previous lane change. That is, the ECU 20 determines whether a plurality of lane changes are to be performed in the regulation time T1. Whether the regulation time T1 has elapsed is determined by referring to the timer whose operation has been started in step S14 of FIG. 2B. If the regulation time T1 has elapsed, the process advances to step S38 to set permission of the lane change, and the processing is ended. If the regulation time T1 has not elapsed, the process advances to step S33.

In step S33, the ECU 20 determines whether the lane change request in step S11 of FIG. 2B is generated on the system side because the lane to travel will disappear due to lane reduction. If the lane change request is generated due to lane reduction, the process advances to step S38. Hence, the continuous lane change is permitted. If it is not a lane change request generated due to lane reduction, the process advances to step S34.

In step S34, the ECU 20 determines whether the lane change request in step S11 of FIG. 2B is generated by route guidance for guiding the vehicle V to the destination. If the lane change request is generated by route guidance, the process advances to step S35. If it is not a lane change request generated by route guidance, the process advances to step S36.

In step S35, the ECU 20 determines whether the regulation time T2 has elapsed from the previous lane change. That is, the ECU 20 determines whether a plurality of lane changes are to be performed in the regulation time T2. Whether the regulation time T2 has elapsed is determined by referring to the timer whose operation has been started in step S14 of FIG. 2B. If the regulation time T2 has elapsed, the process advances to step S38 to set permission of the lane change, and the processing is ended. If the regulation time T2 has not elapsed, the process advances to step S39 to set non-permission of the lane change, and the processing is ended.

The processes of steps S36 and S37 are the same as those of steps S25 and S26 in FIG. 5. That is, in step S36, the ECU 20 determines whether the lane change request in step S11 of FIG. 2B is generated by automatic passing in which the vehicle V passes the preceding vehicle. If it is not a lane change request generated by automatic passing, the process advances to step S39 to set non-permission of the lane change. If it is a lane change request generated by automatic passing, the process advances to step S37. In step S37, the ECU 20 determines whether the series of continuous lane changes by automatic passing will be performed three times or more if the lane change request of this time is executed. If the continuous lane change will be performed three times or more, the process advances to step S39 to set non-permission of the lane change. If the continuous lane change will be performed for the second time, the process advances to step S38 to set permission of the lane change.

As described above, according to this embodiment, the change of the regulation of a continuous course change of the vehicle V includes a change of a regulation period with a length. This can regulate continuously performing a course change during a very short time even if a course change request is a request generated by route guidance. Note that in the example shown in FIG. 7, an example in which a lane change is permitted even during the regulation time T2 in a case of lane reduction or for a continuous lane change request by automatic passing has been described. However, processing of permitting a lane change on a condition that at least one of these is performed outside the regulation time T2, as in the case of route guidance, may be performed.

Third Embodiment

In the first and second embodiments, the regulation of a continuous course change is changed based on the request cause of a course change. The regulation may be changed based on another situation at the time of traveling. In this embodiment, a case in which the regulation is changed based on the traveling environment of a vehicle V will be described.

Figure 8B:
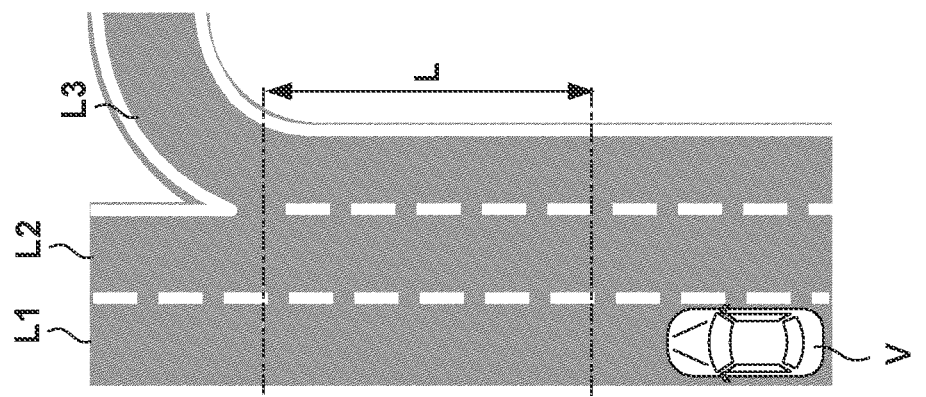
FIGS. 8A and 8B are explanatory views showing another example of regulation.
Figure 8A:
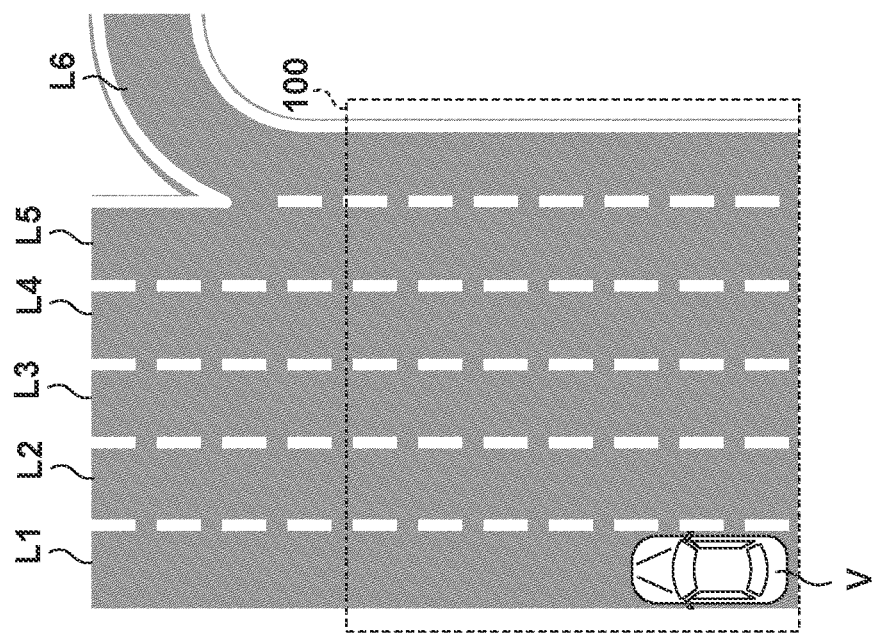

An example of the traveling environment of the vehicle V is a region on a map where the vehicle V is traveling. For example, in a region of light traffic, the regulation of a continuous lane change can be relaxed as compared to a region of heavy traffic. The traffic may further be discriminated based on a time zone. Another example of the region on the map is a traveling path where the number of lane changes increases. FIG. 8A shows an example of this. A region 100 shown in FIG. 8A includes six lanes L1 to L6. To reach the lane L6 that is a branch path from the lane L1, the lane change needs to be repeated. In such a region determined in advance, the regulation of the lane change may be relaxed. The relaxation of the regulation may be permission of a lane change or a change of a regulation period. The current position of the vehicle V can be specified by the recognition result of an ECU 28.

Still another example of the traveling environment of the vehicle V is the situation of the distance from the vehicle V to the closest branch point in the advancing direction. If the branch point is close, the lane of the vehicle V may be changed toward the branch path. Hence, if the distance from the current position of the vehicle V to the branch point is short, the regulation of the continuous lane change is relaxed as compared to a case in which the distance is long. FIG. 8B shows an example of this. The regulation of the continuous lane change is relaxed within the range of a distance L (for example, 100 m) from the branch point. Note that from the same viewpoint as described above, in a case of lane reduction shown in FIG. 4C, the regulation of the continuous lane change may be relaxed within the range of the distance L from the merging point.

Still another example of the traveling environment of the vehicle V is the situation of the distance from the vehicle V to the closest tollgate of a toll road. Near the tollgate, the course of the vehicle V may be changed toward a passage corresponding to each gate. If the distance from the current position of the vehicle V to the branch point is short, the regulation of the continuous lane change is relaxed as compared to a case in which the distance is long. FIG. 9A shows an example of this. In the example shown in FIG. 9A, a tollgate 101 is provided with a plurality of gates G (for example, unmanned gates, and four gates are provided in the example shown in FIG. 9A). The regulation of the continuous lane change is relaxed within the range of the distance L (for example, 100 m) from the tollgate.

Note that the tollgate 101 may be a tollgate in the entrance of a toll road, or may be a tollgate in the exit. Additionally, the passage corresponding to each gate G may not have a boundary line that divides the passage, as in the example shown in FIG. 9A. In this embodiment, such a passage will also be sometimes referred to as a lane.

Yet another example of the traveling environment of the vehicle V is the type of the lane on which the vehicle V is traveling. For example, if the vehicle V is traveling on a passing lane, a lane change to a traveling lane is preferably performed. Hence, if the lane on which the vehicle V is traveling is a passing lane, the regulation of the continuous lane change is relaxed as compared to a case in which the vehicle is traveling on a traveling lane, and a lane change to the traveling lane can be promoted. FIG. 9B shows a case in which the vehicle V has changed the lane from the traveling lane L1 to the passing lane L2. After that, a continuous lane change of the vehicle V is regulated. However, to promote return to the traveling lane L1, the regulation can be relaxed.

As another example of the type of a lane, whether a lane is a lane selected in route guidance for guiding the vehicle V to the destination can be checked. From the viewpoint of route guidance, the vehicle V preferably travels on the selected lane. Hence, if the lane on which the vehicle V is traveling is the selected lane, the regulation may be made stricter as compared to a case in which the lane is not a selected lane, thereby facilitating maintaining the vehicle V on the selected lane. FIG. 9C shows a situation in which the vehicle V has changed the lane from the lane L2 to the lane L1 along a route GR by route guidance. Concerning a continuous lane change after that, since the lane L1 is the selected lane, the regulation is made stricter, and if the occupant instructs a lane change to the lane L2, the lane change can be inhibited.

Figure 10:
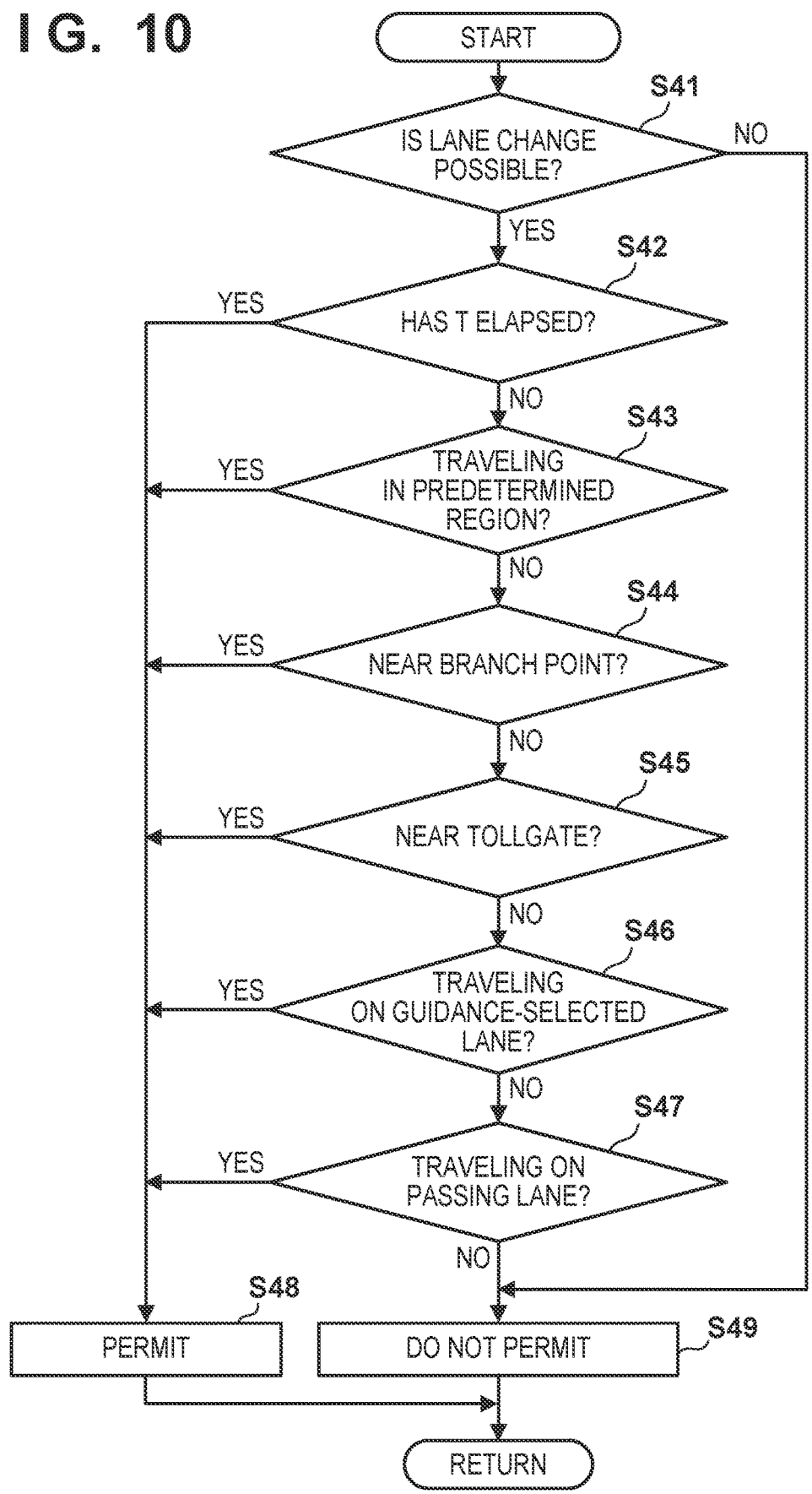
FIG. 10 is a flowchart showing still another example of processing executed by the vehicle control apparatus shown in FIG. 1.

FIG. 10 is a flowchart showing an example of permission/non-permission decision processing in FIG. 2B according to this embodiment. The regulation of a continuous lane change is changed based on the traveling environment of the vehicle V. In this example, the request cause of a lane change request does not matter, unlike the first and second embodiments.

In step S41, the ECU 20 determines, by referring to a target recognition result and the like, whether the situation allows the vehicle V to safely change the lane. This is the same processing as that in step S21 of the example shown in FIG. 5. If the situation allows the vehicle to change the lane, the process advances to step S42. If the situation does not allow the vehicle to change the lane, the process advances to step S48. In step S48, non-permission of the lane change is set, and the processing is ended.

In step S42, the ECU 20 determines whether a regulation time T has elapsed from the previous lane change. That is, the ECU 20 determines whether it is a continuous lane change. Whether the regulation time T has elapsed is determined by referring to the timer whose operation has been started in step S14 of FIG. 2B. If the regulation time T has elapsed, the process advances to step S48 to set permission of the lane change, and the processing is ended. If the regulation time T has not elapsed, the process advances to step S43.

In step S43, the ECU 20 determines whether the vehicle V is traveling in a predetermined region on a map. The predetermined region is, for example, a region of light traffic determined in advance or the region 100 shown in FIG. 8A. Upon determining that the vehicle V is traveling in the predetermined region, the process advances to step S48 to set permission of the lane change. Upon determining that the vehicle V is not traveling in the predetermined region, the process advances to step S44.

In step S44, the ECU 20 determines whether the vehicle V is traveling within a range close to a branch point. For example, the ECU 20 determines whether the vehicle V is traveling within the range of the distance L shown in FIG. 8B. Upon determining that the vehicle V is traveling within a range close to a branch point, the process advances to step S48 to set permission of the lane change. Upon determining that the vehicle V is not traveling within a range close to a branch point, the process advances to step S45.

In step S45, the ECU 20 determines whether the vehicle V is traveling within a range close to the tollgate 101. For example, the ECU 20 determines whether the vehicle V is traveling within the range of the distance L shown in FIG. 9A. Upon determining that the vehicle V is traveling within a range close to the tollgate 101, the process advances to step S48 to set permission of the lane change. Upon determining that the vehicle V is not traveling within a range close to the tollgate 101, the process advances to step S46.

In step S46, the ECU 20 determines whether the vehicle V is traveling on a selected lane by route guidance. For example, the ECU 20 determines whether the vehicle V is traveling on the lane L1, as shown in FIG. 9C. Upon determining that the vehicle V is traveling on the selected lane, the process advances to step S48 to set permission of the lane change. Upon determining that the vehicle V is not traveling on the selected lane, the process advances to step S47.

In step S47, the ECU 20 determines whether the vehicle V is traveling on a passing lane. For example, the ECU 20 determines whether the vehicle V is traveling on the lane L2, as shown in FIG. 9B. Upon determining that the vehicle V is traveling on the passing lane, the process advances to step S48 to set permission of the lane change. Upon determining that the vehicle V is not traveling on the passing lane, the process advances to step S49 to set non-permission of the lane change, and the processing is ended.

As described above, according to this embodiment, the regulation of the continuous lane change of the vehicle V is changed based on the traveling environment of the vehicle V. Accordingly, for example, even if the occupant instructs to do a continuous lane change, the continuous lane change may be permitted in accordance with the traveling environment. It is therefore possible to regulate the continuous lane change without greatly lowering the convenience of the vehicle V.

Note that in the example shown in FIG. 10, processing of permitting a continuous lane change in accordance with the traveling environment is performed. However, processing of changing the regulation period may be performed as in the second embodiment. Additionally, as the traveling environment, a predetermined region (S43), the distance up to a branch point (S44), the distance up to the tollgate 101 (S45), and the type of a lane change (S46 and S47) have been exemplified. At least one of these may be used as a judgment element. Conversely, another traveling environment (for example, the distance up to a merging point) may be added to the judgment element.

Fourth Embodiment

Figure 11A:
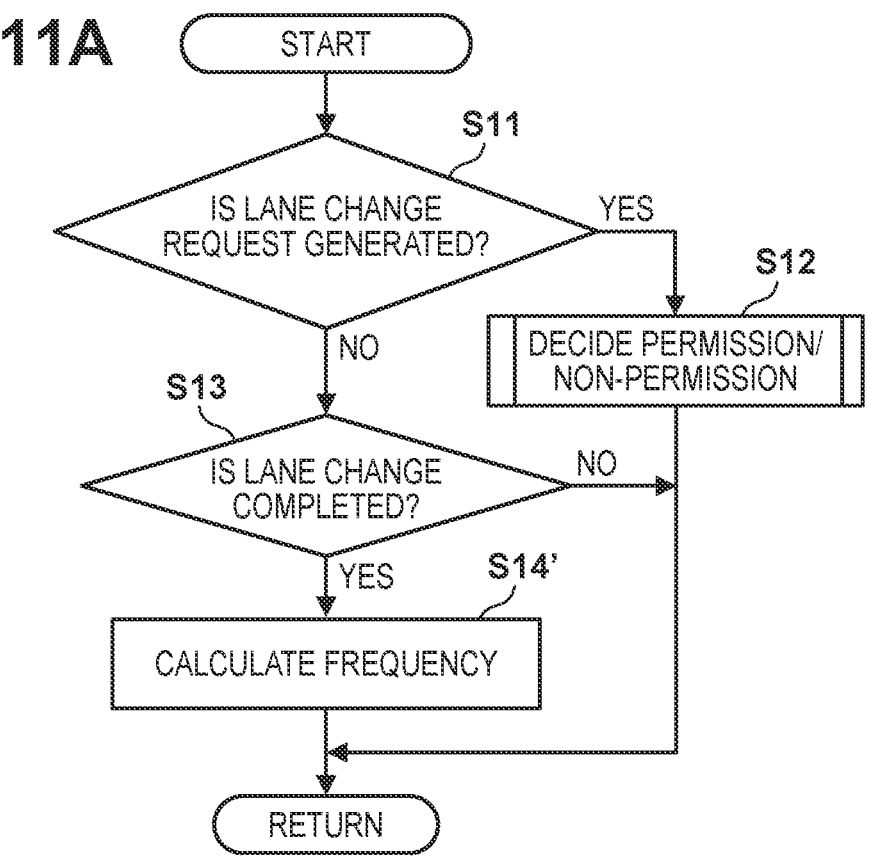
FIGS. 11A and 11B are flowcharts showing yet another example of processing executed by the vehicle control apparatus shown in FIG. 1.

As a situation at the time of traveling in which the regulation of a continuous lane change is changed, the frequency of the lane change may be taken into consideration. If the frequency of the lane change is low, the regulation of the lane change is relaxed. If the frequency is high, the regulation is made stricter. FIG. 11A shows an example of processing of an ECU 20 concerning the regulation of a continuous lane change, and shows an example of processing that replaces the example of processing shown in FIG. 2B. A description of the same processing as the example of processing shown in FIG. 2B will be omitted, and different processing will be described below.

If the ECU 20 determines in step S13 that the lane change is completed, the ECU 20 calculates the frequency of the lane change in step S14' in place of step S14 in FIG. 2B. The frequency can be calculated by setting a lane change per unit traveling distance as one lane change. For example, every time a lane change is completed, the point of completion is recorded. At the time of a lane change, the number of lane changes in a predetermined traveling section (for example, a closest section of 500 m) is specified. The specified number of times is defined as the frequency.

Figure 11B:
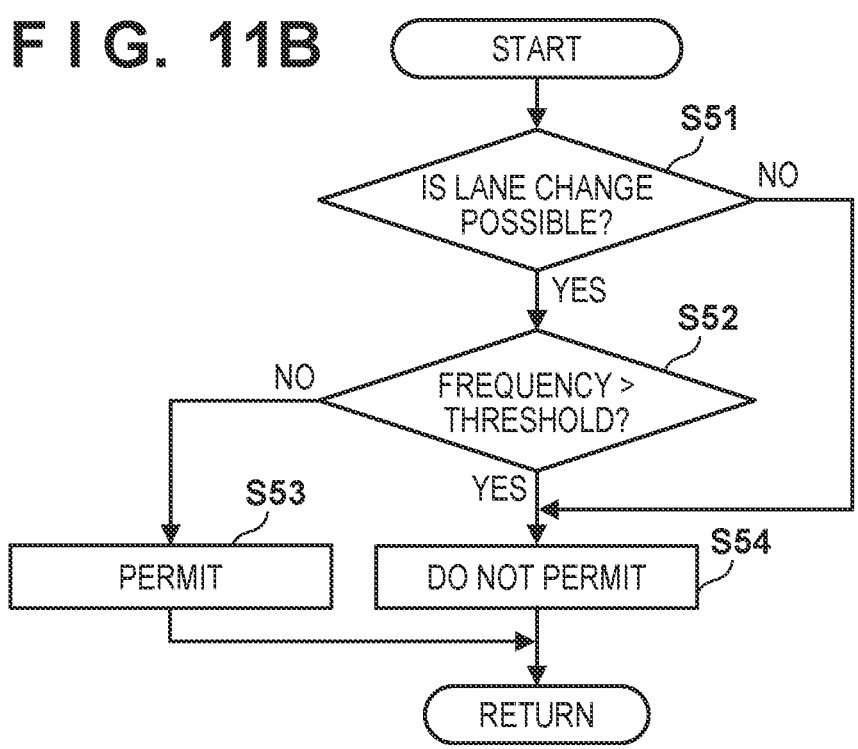

FIG. 11B is a flowchart showing an example of permission/non-permission decision processing in FIG. 2B according to this embodiment. In step S51, the ECU 20 determines, by referring to a target recognition result and the like, whether the situation allows a vehicle V to safely change the lane. This is the same processing as that in step S21 of the example shown in FIG. 5. If the situation allows the vehicle to change the lane, the process advances to step S52. If the situation does not allow the vehicle to change the lane, the process advances to step S54. In step S54, non-permission of the lane change is set, and the processing is ended.

In step S52, the ECU 20 determines whether the frequency calculated in step S14' exceeds a threshold (for example, several times). Upon determining that the frequency exceeds the threshold, the process advances to step S54 to set non-permission of the lane change, and the processing is ended. Upon determining that the frequency does not exceed the threshold, the process advances to step S53 to set permission of the lane change, and the processing is ended.

As described above, in this embodiment, the frequency of the lane change is taken into consideration, thereby regulating repeat of a lane change annoying the periphery. On the other hand, a lane change that is considered to be necessary can be permitted. Note that in the example shown in FIG. 11B, processing of permitting a continuous lane change if the frequency of the lane change is low is performed. The length of the regulation period includes two types for cases of non-permission and permission of the lane change (a case of a regulation time T and a case of a regulation time of 0). However, the length of the regulation period may be changed in accordance with the frequency. For example, the frequency is divided into three levels of 1, 2, and 3. A regulation time T1 may be set for frequency 3 or more, a regulation time T2 (<T1) may be set for frequency 2, and a regulation time T3 (=0) may be set for frequency 1. At any rate, if the frequency is high, the regulation period is set short as compared to a case in which the frequency is low, thereby regulating repeat of a lane change annoying the periphery. On the other hand, a lane change that is considered to be necessary can be permitted.

Other Embodiments

The first and second embodiments can appropriately be combined. When combining the first embodiment and the third embodiment, priority can be given to any one of the request cause and the traveling environment. For example, in a case in which priority is given to the request cause, for a lane change request by route guidance, a continuous lane change is permitted independently of the traveling environment. For a lane change request by an instruction of the occupant, a continuous lane change is permitted depending on the traveling environment. Conversely, in a case in which priority is given to the traveling environment, if the vehicle is traveling in a predetermined region (step S43), a continuous lane change is permitted independently of the request cause of the lane change.

In addition, the request cause and the traveling environment can be weighted conditions. For example, if the remaining distance up to the branch point is a predetermined distance or less (FIG. 8B), and the request cause of the course change is route guidance, the continuous course change of the vehicle V may be relaxed (the continuous course change is not regulated, or the regulation period with a length is shortened). Similarly, if the remaining distance up to the tollgate is a predetermined distance or less (FIG. 9A), and the request cause of the course change is route guidance, the continuous course change of the vehicle V may be relaxed (the continuous course change is not regulated, or the regulation period with a length is shortened).

Summary of Embodiment

The above-described embodiment discloses at least the following embodiment.

1. A vehicle control apparatus (for example, 1) according to the above embodiment is a vehicle control apparatus for controlling a vehicle, comprising:

traveling control means (for example, 20, S3) for controlling traveling of the vehicle including a course change; and regulation means (for example, 20, S12) for regulating a plurality of course changes of the vehicle within a predetermined period by the traveling control means, wherein regulation by the regulation means is changed based on a situation of the vehicle at the time of traveling.

According to this embodiment, instead of uniformly regulating a continuous course change, the regulation is changed based on the situation of the vehicle at the time of traveling. It is therefore possible to regulate the continuous course change of the vehicle without greatly lowering the convenience of the vehicle.

2. In the above embodiment, the situation includes a request cause of the course change (for example, FIGS. 4A-4C).

According to this embodiment, the situation is discriminated based on the request cause of a course change request, and the regulation is changed. It is therefore possible to perform regulation and relaxation of the regulation according to the request cause.

3. In the above embodiment, the request cause includes route guidance for guiding the vehicle to a destination under the control of the traveling control means, and if the route guidance is the request cause, the regulation means does not regulate the course change (for example, S24).

According to this embodiment, route guidance can be performed more smoothly.

4. In the above embodiment, the request cause includes route guidance for guiding the vehicle to a destination under the control of the traveling control means, and if the route guidance in a case in which a remaining distance up to a branch point is not more than a predetermined distance is the request cause, the regulation means does not regulate the course change.

According to this embodiment, the regulation can be relaxed if it is particularly necessary for route guidance.

5. In the above embodiment, the request cause includes route guidance for guiding the vehicle to a destination under the control of the traveling control means, and if the route guidance in a case in which a remaining distance up to a tollgate of a toll road is not more than a predetermined distance is the request cause, the regulation means does not regulate the course change.

According to this embodiment, the regulation can be relaxed if it is particularly necessary for route guidance.

6. In the above embodiment, the request cause includes at least two of route guidance for guiding the vehicle to a destination under the control of the traveling control means (for example, FIG. 4A), passing of a preceding vehicle during traveling under the control of the traveling control means (for example, FIG. 4B), lane reduction of a traveling road during traveling under the control of the traveling control means (for example, FIG. 4C), or a course change instruction by an occupant (for example, 51, 52).

According to this embodiment, the situation is discriminated based on the request cause of a lane change request, and the regulation is changed. It is therefore possible to perform regulation and relaxation of the regulation according to the request cause.

7. In the above embodiment, the request cause includes a course change instruction by an occupant, and a system request in the view of traveling control of the vehicle by the traveling control means, and if the course change instruction is the request cause, regulation by the regulation means is stricter than a case in which the system request is the request cause (for example, FIG. 5, FIG. 7).

According to this embodiment, if the occupant unnecessarily instructs a continuous course change, it is possible to regulate execution of it, and execute a course change necessary on the system side.

8. In the above embodiment, the request cause includes route guidance for guiding the vehicle to a destination under the control of the traveling control means, and a course change instruction by an occupant, and if the course change instruction is the request cause, the regulation means regulates the plurality of course changes of the vehicle within the predetermined period (for example, T or T1), and if the route guidance is the request cause, the regulation means does not regulate the course change (for example, S24), or regulates the plurality of course changes of the vehicle within a period shorter than the predetermined period (for example, S35).

According to this embodiment, if the occupant unnecessarily instructs a continuous course change, it is possible to regulate execution of it, and execute a course change necessary for route guidance.

9. In the above embodiment, the situation includes a traveling environment of the vehicle (for example, FIGS. 8A-8B).

According to this embodiment, the situation is discriminated based on the type of the traveling environment of the vehicle, and the regulation is changed. It is therefore possible to perform regulation and relaxation of the regulation according to the traveling road or a geographical circumstance.

10. In the above embodiment, the situation includes a lane on which the vehicle is traveling in a traveling road with a plurality of lanes (for example, FIGS. 9B-9C).

According to this embodiment, it is possible to discriminate the situation based on the lane and change the regulation.

11. In the above embodiment, if the lane on which the vehicle is traveling is a selected lane selected in route guidance for guiding the vehicle to a destination under the control of the traveling control means, regulation by the regulation means is stricter than a case in which the lane is a lane that is not the selected lane (for example, S46).

According to this embodiment, it is possible to facilitate maintaining traveling of the vehicle on a lane selected in route guidance.

12. In the above embodiment, the situation includes a current position of the vehicle with respect to a branch point (for example, FIG. 8B), and if the current position is close to the branch point, regulation by the regulation means is lighter than a case in which the current position is far (for example, S44).

According to this embodiment, it is possible to facilitate a course change prepared for the branch point while regulating a continuous course change.

13. In the above embodiment, the situation includes a region (for example, 100) on a map where the vehicle is traveling.

According to this embodiment, it is possible to change regulation in correspondence with a geographical circumstance.

14. In the above embodiment, a change of regulation by the regulation means includes at least one of presence/absence of the regulation and a change of a length of the predetermined period.

15. In the above embodiment, the situation includes the number of course changes per unit traveling distance, and if the number of course changes per unit traveling distance is large, the predetermined period is set shorter than a case in which the number of course changes per unit traveling distance is small (for example, FIG. 11B).

According to this embodiment, the frequency of the course change is taken into consideration, thereby regulating repeat of a course change annoying the periphery. On the other hand, a course change that is considered to be necessary can be permitted.

16. A vehicle according to the above embodiment is a vehicle (for example, V) comprising the above-described vehicle control apparatus.

According to this embodiment, instead of uniformly regulating a continuous course change, the regulation is changed based on the situation at the time of traveling. It is therefore possible to regulate the continuous course change of the vehicle without greatly lowering the convenience of the vehicle.

The invention is not limited to the foregoing embodiments, and various variations/changes are possible within the spirit of the invention.

What is claimed is:

1. A vehicle control apparatus for controlling a vehicle, comprising:
a controller including at least one processor and at least one storage device and configured to
control traveling of the vehicle including a course change; and
regulate a plurality of course changes of the vehicle within a predetermined time period,
wherein regulation of the course changes is changed based on a situation of the vehicle at the time of traveling,
the situation includes a request cause of the course change, the request cause includes route guidance for guiding the vehicle to a destination under the control of the controller, and
if the route guidance in a case in which a remaining distance up to a branch point is not more than a predetermined distance is the request cause, the course change is not regulated, and
if the route guidance in a case in which a remaining distance up to a branch point is more than a predetermined distance is the request cause, the course change is regulated.

2. A vehicle control apparatus for controlling a vehicle, comprising:
a controller including at least one processor and at least one storage device and configured to
control traveling of the vehicle including a course change; and
regulate a plurality of course changes of the vehicle within a predetermined time period,
wherein regulation of the course changes is changed based on a situation of the vehicle at the time of traveling,
the situation includes a request cause of the course change, the request cause includes route guidance for guiding the vehicle to a destination under the control of the controller, and
if the route guidance in a case in which a remaining distance up to a tollgate of a toll road is not more than a predetermined distance is the request cause, the course change is not regulated, and
if the route guidance in a case in which a remaining distance up to a tollgate of a toll road is more than a predetermined distance is the request cause, the course change is regulated.

3. A vehicle control apparatus for controlling a vehicle, comprising:
a controller including at least one processor and at least one storage device and configured to
control traveling of the vehicle including a course change; and
regulate a plurality of course changes of the vehicle within a predetermined time period,
wherein regulation of the course changes is changed based on a situation of the vehicle at the time of traveling,
the situation includes a request cause of the course change,
the request cause can include either one of
a course change instruction by an occupant, and
a system request in the view of traveling control of the vehicle by the controller, and
if the course change instruction is the request cause, the regulation is stricter than a case in which the system request is the request cause.

* * * * *